Figure 1:
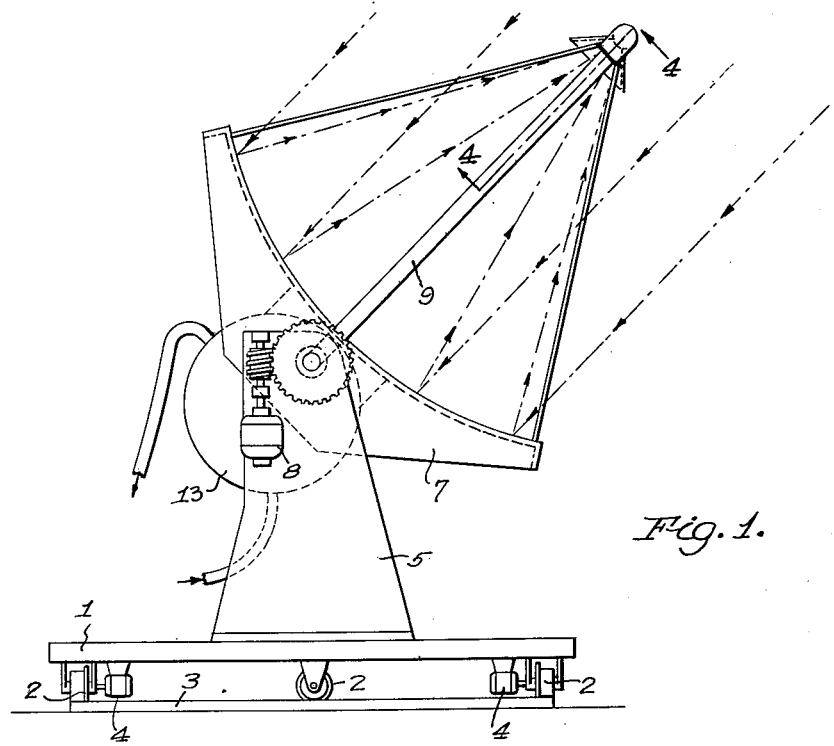

Dec. 5, 1939.     S. A. COURTIS ET AL     2,182,222

SOLAR HEATER

Filed Nov. 23, 1936     2 Sheets-Sheet 1

INVENTORS
Stuart A. Courtis,
Walter F. Courtis,
BY
ATTORNEYS

Dec. 5, 1939.  S. A. COURTIS ET AL  2,182,222
SOLAR HEATER
Filed Nov. 23, 1936   2 Sheets-Sheet 2

INVENTORS
Stuart A. Courtis,
Walter F. Courtis,
BY
ATTORNEYS

Patented Dec. 5, 1939

2,182,222

UNITED STATES PATENT OFFICE 2,182,222

SOLAR HEATER

Stuart A. Courtis and Walter F. Courtis,
Detroit, Mich.

Application November 23, 1936, Serial No. 112,276

5 Claims. (Cl. 126—270)

The present invention relates to apparatus for collecting and utilizing radiant energy from a solar source and has as its primary object to provide a comparatively simple form of apparatus which is highly efficient, and which makes possible the construction of apparatus practical for use on a large scale.

Another object of the invention is to provide apparatus of the character referred to embodying a parabolic reflector and an energy collecting tube rigidly supported in the focal line of the mirror so that when the reflector is adjusted with respect to the source of radiant solar energy, about vertical and horizontal axes, the relationship of the collector tube with respect to the focal line of the reflector remains unchanged. Therefore, the only adjustments necessary are those wherein the reflector is moved about vertical and horizontal axes in order to properly position it with respect to the source of radiant solar energy. A very desirable characteristic results from such a relationship, especially when it is considered that the amount of energy obtainable through solar radiation is comparatively small and that in order to utilize enough energy for practical purposes the apparatus must be constructed on a large scale. When the apparatus is constructed on a large scale the parts thereof must be heavy in order to provide the required mechanical strength, and when the parts are made heavy their movement about their horizontal axis becomes difficult. Movement about a vertical axis may be attained in a simple manner by mounting the apparatus on a turn-table, such as heretofore has been been done in the art. In order to make possible movement of the reflector about a horizontal axis the same is supported substantially intermediate its ends on a horizontal fulcrum and a conversion unit or heat transfer is supported on the same fulcrum in counterpoise relation to the reflector. Accordingly, it is another object of the invention to support a parabolic reflector and a conversion unit or heat transfer in counterpoise relation with respect to a horizontal axis so that movement of the reflector about the horizontal axis may be caused with a minimum expenditure of power and without subjecting the same to undesirable stresses.

Another object of the present invention is to provide apparatus of the character above pointed out wherein the tube which is supported in the focal line of the reflector is insulated, the tube being entirely enclosed in insulation with the exception of a narrow transparency extending in the direction of the length thereof and disposed in the focus of the reflector.

Another object is to provide reflectors adjacent the transparency in the heat collecting tube to direct focused rays through said transparency in the event the parabolic reflector is not in perfect adjustment with respect to the source of radiant solar energy. The tube reflectors also prevent heat losses in that they protect the part of the tube which is not protected by insulation from heat losses due to convection currents in the surrounding air, and further, they tend to minimize the effect of wind and other atmospheric disturbances.

Still another object of the invention is to provide means for circulating an energy collecting fluid through the tube, said means being enclosed in the means which supports the tube in the focus of the reflector so that it may be adequately insulated to prevent heat losses. The insulation of the conduction conduits is important due to the fact that the tube must necessarily be supported some distance remote from the reflector and requires long connecting conduits between the tube and the heat transfer unit. The heat loss from these connecting conduits would be prohibitive except that the arrangement lends itself to enclosing of the conduits in vacuum jackets, or surrounding them with other means of thermal insulation. The present apparatus thus efficiently conserves the collected energy until it is delivered to a point where it may perform some useful function.

Figure 2:
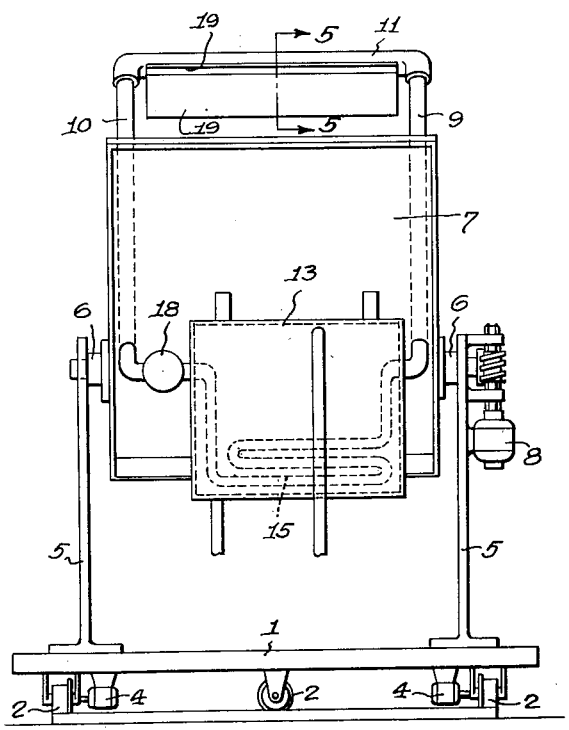
Figure 3:
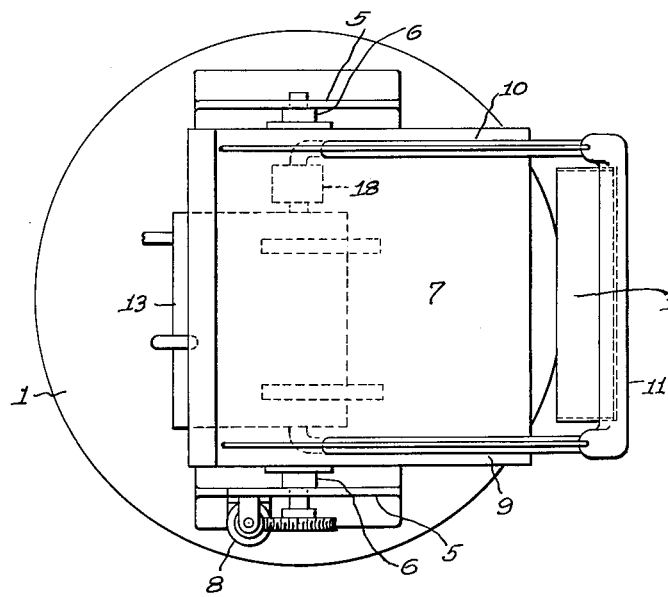
Figure 4:
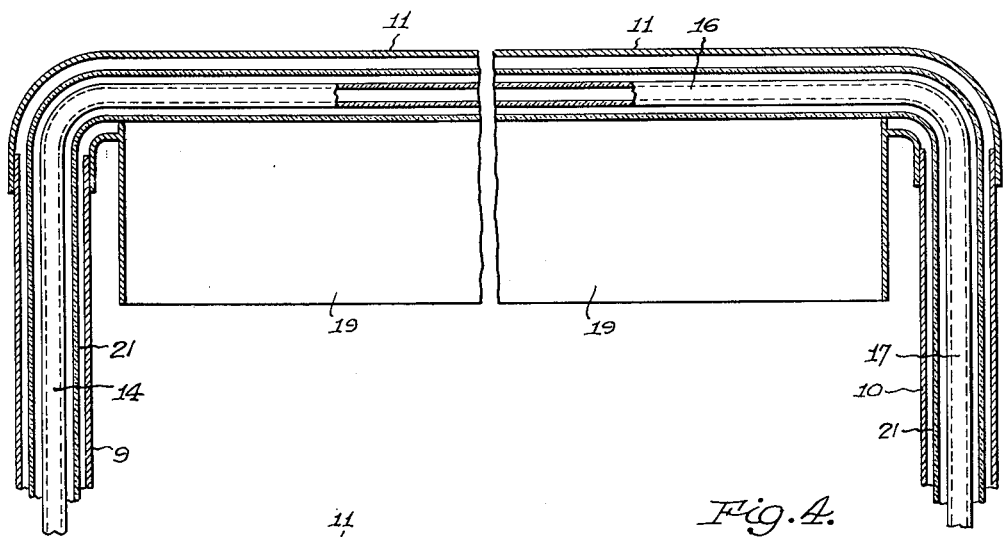
Figure 5:
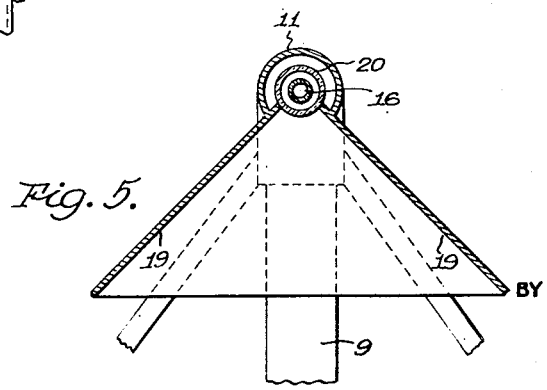

With the above and other ends in view the invention consists in matters more particularly set forth hereinafter with reference to the accompanying drawings, in which Fig. 1 is a side elevation;
Fig. 2 is an end elevation;
Fig. 3 is a plan view;
Fig. 4 is a section taken on the line 4—4 of Fig. 1, and
Fig. 5 is a section taken on the line 5—5 of Fig. 2.

Like characters of reference are employed throughout to designate corresponding parts.

The numeral 1 designates a turn-table supported by rollers 2 upon a circular track 3. Motors 4 are operatively connected to the rollers 2 to cause rotation thereof and to thereby cause movement of the turn-table about a vertical axis. Mounted upon the table 1 are two horizontally spaced vertically extending standards 5 in which are rotatably supported the trunnions 6 of a parabolic reflector 7. To one of the trunnions 6 is geared an electric motor 8 for rotating said trunnion and causing movement of the reflector about the axes of the two trunnions.

It will be noted, upon reference to the drawings, that the axes of the trunnions 6 are horizontal and that the movement of the parabolic reflector is, therefore, about a horizontal axis.

Supported by the parabolic reflector is a substantially U-shaped metallic frame having its two runs 9 and 10 secured to the reflector and the run 11, supported by the two runs 9 and 10, disposed in the focal line of the reflector. A continuous circulating system including a heat exchanger or heat transfer unit 13 is mounted beneath the reflector 7 to fulcrum therewith, the unit 13 thus being disposed whereby its weight counterbalances the weight of the reflector. The circulating system includes a liquid conduit 14 which extends through the frame run 9 and is connected at its lower end to a heat transfer coil 15 in the heat exchanger 13. At its upper end the conduit 14 is connected to a transparent tube 16 in the frame run 11. A conduit 17 is connected to the other end of the tube 16 and extends through the frame run 10 to a pump 18 and to the other end of the heat transfer coil 15. From the foregoing, it becomes obvious that a fluid received from the coil 15 may be circulated consecutively through the conduit 17, tube 16, conduit 14 and back to coil 15 by the pump 18. It is preferable that this fluid be an opaque liquid.

With the apparatus adjusted to the position shown in Fig. 1, radiant energy striking the reflector 7 as indicated by the arrows is focused on the tube 16 and causes the liquid circulated therethrough to be heated. The liquid so heated, when passed through the transfer unit, gives off its heat and the heat may be utilized, for example, to heat water or to generate steam in the unit 13.

In order to permit the focused rays to heat the liquid without heating the metal frame run 11 the latter is provided with an opening extending throughout the length thereof. At each side of the opening thus provided are mounted reflectors 19 which also serve as extended heat conducting members. These reflectors correct, in part, lack of perfection in the adjustment of the parabolic reflector with respect to the source of solar energy and also provide protection against convection losses and losses due to wind and other atmospheric disturbances.

The construction above described makes possible the use of a comparatively thin glass tube at 16, since its weight and that of the circulated liquid is supported by the metallic frame. Further, the construction permits the enveloping or partial enveloping of the tube 16 in a vacuum tube 20, with a marked reduction in heat losses. Enclosing the conduits 14 and 17 in the frame runs 9 and 10 likewise makes it possible to employ an enveloping vacuum tube 21. Although it is not here shown it will be obvious to those skilled in the art that the space between the vacuum tubes 20 and 21 and their supporting metallic parts may, if desired, be filled with heat insulation.

Although a specific embodiment of the invention has been illustrated and described it will be understood that various changes may be made within the scope of the appended claims without departing from the spirit of the invention, and such changes are contemplated.

What we claim is:

1. Apparatus for collecting and utilizing radiant solar energy comprising a parabolic reflector, a tube rigidly supported in the focus of said reflector, means for circulating energy collecting fluid through said tube, means supporting said reflector for movement about a horizontal axis, a heat exchanger for receiving the circulated fluid and for extracting heat therefrom, said exchanger being mounted on said reflector in counterpoise relation therewith and with said tube whereby a minimum turning effort is required to move said reflector about said horizontal axis, and means for moving said reflector about a vertical axis.

2. Apparatus for collecting and utilizing radiant solar energy comprising a parabolic reflector, a tube rigidly supported in the focus of said reflector, means for circulating energy collecting fluid through said tube, means supporting said reflector for movement about a horizontal axis, a heat exchanger for receiving the circulated fluid and for extracting heat therefrom, said exchanger being mounted in counterpoise relation with said reflector and tube whereby a minimum turning effort is required to move said reflector about said horizontal axis, and means for moving said apparatus bodily about a vertical axis.

3. In an apparatus for collecting and utilizing radiant energy from a solar source, a pivotally supported reflector, a heat exchanger mounted on and rearward of said reflector and rearward of the pivotal axis of the reflector, a continuous circulatory system including said heat exchanger and having a portion positioned forward of said reflector and of the pivotal axis thereof, and a conduit enclosing said portion and having an opening facing toward said reflector said heat exchanger acting as a counterpoise for a part of said system and for said conduit.

4. In an apparatus for collecting and utilizing radiant energy from a solar source, a reflector, supporting means for said reflector, a heat exchanger mounted on and rearward of said reflector, a U-shape conduit having its opposite ends connected to said heat exchanger and having a portion intermediate its ends positioned in advance and substantially at the focal point of said reflector, a second U-shaped conduit enclosing said first named conduit in spaced relation thereto, and a third U-shaped conduit enclosing both of said other named conduits and having an opening at said portion facing toward said reflector.

5. In an apparatus for collecting and utilizing radiant energy from a solar source, a reflector, a continuous circulatory system for a heat transference medium, said system having a portion thereof positioned substantially at the focal point of said reflector, a conduit surrounding said portion in spaced relation thereto, a second conduit surrounding said first named conduit in spaced relation thereto and having an opening at the focal point of and facing said reflector, and a pair of reflector members relatively diverging from said opening toward said reflector and cooperating with a surface portion of said second named conduit to close the annular space between said conduits at said opening.

STUART A. COURTIS.
WALTER F. COURTIS.